United States Patent
Goldman et al.

(10) Patent No.: US 6,728,587 B2
(45) Date of Patent: Apr. 27, 2004

(54) METHOD FOR GLOBAL AUTOMATED PROCESS CONTROL

(75) Inventors: Arnold J. Goldman, Jerusalem (IL); Jehuda Hartman, Rehovot (IL); Joseph Fisher, Jerusalem (IL); Shlomo Sarel, Ma'aleh Michmash (IL)

(73) Assignee: Insyst Ltd., Jerusalem (IL)

( * ) Notice: Subject to any disclaimer, the term of this patent is extended or adjusted under 35 U.S.C. 154(b) by 338 days.

(21) Appl. No.: 09/747,977

(22) Filed: Dec. 27, 2000

(65) Prior Publication Data

US 2002/0082738 A1 Jun. 27, 2002

(51) Int. Cl.$^7$ .............................................. G06F 19/00
(52) U.S. Cl. ........................ 700/108; 700/95; 700/109
(58) Field of Search ............................ 700/28, 32, 51, 700/54, 71, 95, 108–109, 121, 96–97; 702/81, 84, 182

(56) References Cited

U.S. PATENT DOCUMENTS

| | | | |
|---|---|---|---|
| 4,970,658 A | * | 11/1990 | Durbin et al. |
| 5,105,362 A | * | 4/1992 | Kotani ........................ 700/108 |
| 5,325,466 A | | 6/1994 | Kornacker |
| 5,440,478 A | | 8/1995 | Fisher et al. ................. 700/109 |
| 5,479,340 A | | 12/1995 | Fox et al. ....................... 700/33 |
| 5,483,468 A | | 1/1996 | Chen et al. ................... 702/186 |
| 5,546,507 A | * | 8/1996 | Staub |
| 5,644,493 A | * | 7/1997 | Motai et al. .................... 700/96 |
| 5,654,903 A | * | 8/1997 | Reitman et al. ............... 702/81 |
| 5,691,895 A | * | 11/1997 | Kurtzberg et al. ............ 700/29 |
| 5,751,582 A | | 5/1998 | Saxena et al. |
| 5,761,093 A | * | 6/1998 | Urbish et al. ................ 700/107 |
| 5,787,425 A | * | 7/1998 | Bigus |
| 5,862,054 A | | 1/1999 | Li ................................. 700/121 |
| 5,875,285 A | * | 2/1999 | Chang |
| 5,896,294 A | | 4/1999 | Chow et al. |
| 6,032,146 A | * | 2/2000 | Chadha et al. |
| 6,073,138 A | * | 6/2000 | de l'Etraz et al. |
| 6,134,555 A | * | 10/2000 | Chadha et al. |
| 6,197,604 B1 | * | 3/2001 | Miller et al. ................... 438/14 |
| 6,230,069 B1 | * | 5/2001 | Campbell et al. ........... 700/121 |
| 6,240,329 B1 | * | 5/2001 | Sun |
| 6,249,712 B1 | * | 6/2001 | Boiquaye |
| 6,263,255 B1 | * | 7/2001 | Tan et al. .................... 700/121 |
| 6,360,133 B1 | * | 3/2002 | Campbell et al. ........... 700/115 |
| 6,470,230 B1 | * | 10/2002 | Toprac et al. ............... 700/121 |

FOREIGN PATENT DOCUMENTS

WO    WO 00/00874    *  1/2000

OTHER PUBLICATIONS

Triant Our Products http://www.triant.com/top.html [10 pages].

(List continued on next page.)

*Primary Examiner*—Wilbert L. Starks, Jr.
*Assistant Examiner*—Ronald D Hartman, Jr.
(74) *Attorney, Agent, or Firm*—G. E. Ehrlich Ltd.

(57) ABSTRACT

A method and system to enhance yield in multi-process manufacturing. The method comprising the translation of a performance parameter of a product into input variables to operate tools carrying our cooperating processes which built a structural element which determines the performance parameter, wherein the individual tools are process controlled. The method further comprising the integration of process control of individual separate processes or of stages in a process, into a combined and comprehensive (modular) process control in which the process parameters of a process are enslaved to accomplish the target output of the final process. Hence target output values of intermediate processes are dynamically reassigned during the manufacturing with respect to their initially designed values, in accordance with the output of their cooperating processes.

17 Claims, 9 Drawing Sheets

OTHER PUBLICATIONS

Artificial Intelligence and Manufacturing: A Research Planning Report, Leslie D. Interrante Aug. 8, 1997, http://sigmans.cs.umn.edu/sigmanwrk/report96.htm [34 pages].

On the Epistemology and Management of Electronic Design Automation Knowledge, Scott et al, http://www.azstarnet.com/scottmc/medak/Epistermology.htm [17 pages].

Army Medical Knowledge Engineering System (AMKES)—A Three-Tier Knowledge Harvesting Environment, Merritt et al, Practical Applications of Java 1999 Conference Proceedings, http://amzi.harvard.net/articles/amkes_pajava99.htm [7 pages].

Final Model Business Case Report for the OSD CALS IWSDB Project, An MVP Joint Venture, ManTech International Corporation, Dec. 2, 1994, Kidwell et al., http://www2.dcnicn.com/cals/iwsdb/task07/html/a024/Fmodbustl.htm [77 pages].

Computer Aided Knowledge Engineering, British Steel, Mackenzie, http://www.cogsys.co.uk/cake/CAKE-Test-Site-BS.htm [12 pages].

Constructivist Foundations of Modeling—A Kantian Perspective, Marco C. Bettoni, Internat. Journal of Intelligent Systems, vol. 12, No. 8, Aug. 1998, pp 577–595.

Knights Technology, Inc. at-a-Glance, http://www.knights.com/ktglance.htm [18-pages].

Work in Progress: Visual Specification of Knowledge Bases, Gavrilova, et al http://www.csa.ru/Inst/gorb_dep/artific/IA/ben-last.htm [8-pages].

Object Space Solutions for a Connected World, http://www.ObjectsSpace.com/products/prodCatalyst.asp [11-pages].

Adventa Corporate Overview, http://www.adventact.com/corporat.htm [28 pages].

Domain Manufacturing, http://www.domainmfg.com/mfg/starfire/industry-specific-auto.htm [10 pages].

HPL Corporate http://www.hpl.com/Corporate/history.htm [6 pages].

Semy Engineering Home Page http://www.semy.com [9 pages].

KLA-Tencor: Leading the Yield Management Market http://www.tencor.com [15 pages].

Yield Dynamics, Inc. http://www.ydyn.com/products/yield.htm [9 pages].

* cited by examiner

METHOD FOR GLOBAL AUTOMATED PROCESS CONTROL

BACKGROUND OF THE INVENTION

The invention relates to quality control in general, more particularly, to a system and method for automated process control of stages in articles manufacturing and most specifically to the integration of process control of separate manufacturing stages into a modular structure to yield a comprehensive automated process control of the complete production line. This invention is also related to U.S. patent application Ser. No. 09/633,824 by Goldman, et al. entitled "Strategic Methods for Process Control" filed Aug. 7, 2000, to U.S. patent application Ser. No. 09/689,884 by Goldman, et al entitled "System and Methods for Monitoring Process Quality Control" filed Oct. 13, 2000; and to U.S. patent application by Goldman, et al, entitled "A method and Tool for Data Mining in Automatic Decision Making Systems" filed Dec. 8, 2000, all of which are incorporated by reference for all purposes as if fully set forth herein.

Process control plays a fundamental role in attaining high yield of quality products. Among various process control methods, statistical process control (SPC) is well known. SPC relies on the observation of the deviation of a measurable process output parameter in the process from their statistically predicted distribution (e.g. by more than three standard deviations). SPC reveals trends towards a deterioration of a process as well as temporarily irregularities of parameters of a process.

Prior attempts have been made to automate SPC.

U.S. Pat. No. 5,483,468 to Chen et al describes a system and method for concurrently recording and displaying system performance data by a computing system. In this invention a method is described in which a user interacts with the data being displayed to create various analysis of that data with the intentions of improving system performance.

U.S. Pat. No. 5,479,340 to Fox et al. describes a multivariate analysis of components of an ongoing semiconductor process for real time in-situ control. In this invention the algorithm calculates the $T^2$ value from lotteling $T^2$ statistical analysis which in turn creates a feedback signal if the $T^2$ value is out of range and stops the process.

U.S. Pat. No. 5,440,478 to Fisher et al. describes a method and system for controlling a manufacturing process using statistical indicators of performance from the production process and specification data. The data is entered into a computer and displayed in tables and bar graphs to enable the production control manager to see unfavorable trends and processes out of control to allow adjustment of the manufacturing process before the process run is completed.

U.S. Pat. No. 5,862,054 to Li describes a system for real time statistical process control having the capability to monitor multiple process machines at the same time with a mix of different types of machines. The specific implementation of that invention is in connection with semiconductor wafer fabrication process machinery such as for ion replantation. It is also applicable to other processes and process equipment where it is necessary for automatic collection of process parameter data for SPC and the subsequent usage of the data to show trends and the goodness of the operating machinery.

All the aforementioned techniques suffer from inherent limitations resulting from the fact that their focus is the controlled variable, without linking the parameters, which influence the controlled variable. Thus, these techniques lack the ability to identify the combination of factors in a multi factorial process which is responsible for an observed deviation of an output of a process. Consequently, the process controlled by these methods can't be rectified on the fly, but rather can only be halted until the process engineer finds out the related problem.

To overcome this drawback, Goldman, et al in their patent application Ser. No. 09/689,894 entitled: "System and Method for Monitoring Process Quality Control" (hereinafter the POEM Application), described a method for an advanced process control (APC) which is essentially an on line monitoring and control of process parameters aimed to yield a robust process output having optimum statistical attributes (such as $C_p$ and $C_k$).

A modern production line comprises a great number of process stages performed in series by a diversity of manufacturing tools, thus a work piece which consist of an output of a first manufacturing tool is delivered as an input entity to a second manufacturing tool and so on until the product is finally shaped.

Furthermore, the term "manufacturing tool" represents a plurality of units performing the same process on various article in parallel, e.g. a line of polishing machines in a microelectronic facility, each polishing one wafer at its time in accordance with the peculiar conditions of the machine, or a tool which can handle a plurality of items at once e.g. a diffision oven which handle tenth of wafers in a single run.

Until now, no quality control method did try to cope with the challenge that due to the "fact of life" that a production tool is not always tuned and therefore the designed nominal values of a process output carried out by this tool may vary within its tolerances in such a way that the final target will not be achieved. The present invention suggests a corrective action to be taken to "save" final target quality. This is achieved by a trade off mechanism which is based on a judicious combination of the deviating output with one or more other outputs which are deliberately diverted from their initially set target value.

Until now process control methods have been devised to control and optimize an output of a single stage in a multistage manufacturing process, and no attention was paid as to how the controlled parameters of a controlled first process affect an output of a subsequent second controlled process that follows (and functionally relies on the output of) the first stage. In addition, no attention was paid to the impact of subsequent stages output on previous stages outputs, with regard to the optimal values to be set as output targets.

As a result it is nowadays impossible to have a global process control, which integrally combines all the various steps in a processes.

The present invention fulfills this gap and provides other related advantages as is detailed below.

SUMMARY OF THE INVENTION

The present invention describes a method and system of a global process control, which integrally controls all the steps and stages in a process that lead a production item (e.g. a wafer in the semiconductor industry) through its voyage from raw material (a wafer) to the final product (a device).

The present invention leads to a totally different paradigm to run a production facility, where the intermediate targets for the individual machines are set dynamically during the process, in accordance with the final target for the finished product.

In accordance with the present invention there is provided a method for controlling a product quality during product manufacturing, the manufacturing includes a plurality of processes, each process among said plurality of processes has an assigned value of the process target output the method comprising the step of:

reassigning the value of the target output of a first process among said plurality of processes in accordance to an output of at least one second process.

In accordance with the present invention there is provided a method for controlling a product quality comprising the steps of: (a) assigning the product a predetermined criteria with respect to a performance of the product; (b) linking the performance to a feature of at least one structural element of the product and, (c) associating the feature of at least one structural element with at least one stage in a process which terms that at least one structural element, wherein at least two process stages are modular process controlled.

In accordance with the present invention there is provided a system for controlling a product quality in production, that includes a plurality of processes, each process among the plurality of processes has an assigned value of target output, wherein the assigned value of target output of a first process among the plurality of processes is reassigned during the occurrence of the production in accordance to an output value of a second process among the plurality of processes, the system comprising: (a) a mechanism for monitoring of the output value of the second process; (b) a mechanism for the evaluating the output value of the second process; (c) a mechanism for reassignment a value to target output of the first process according to the evaluation of the output value of the second process and; (d) a modeller to predict a feed forward input which results with the reassigned target value having best statistical goodness.

Other objects and benefits of the invention will become apparent upon reading the following description taken in conjunction with the accompanying drawings.

DETAILED DESCRIPTION OF THE EMBODIMENTS

The embodiments described herein are not intended to be exhaustive and to limit in any way the scope of the invention, rather they are used as examples for the clarification of the invention and for enabling of other skilled in the art to utilize its teaching.

Figure 1:
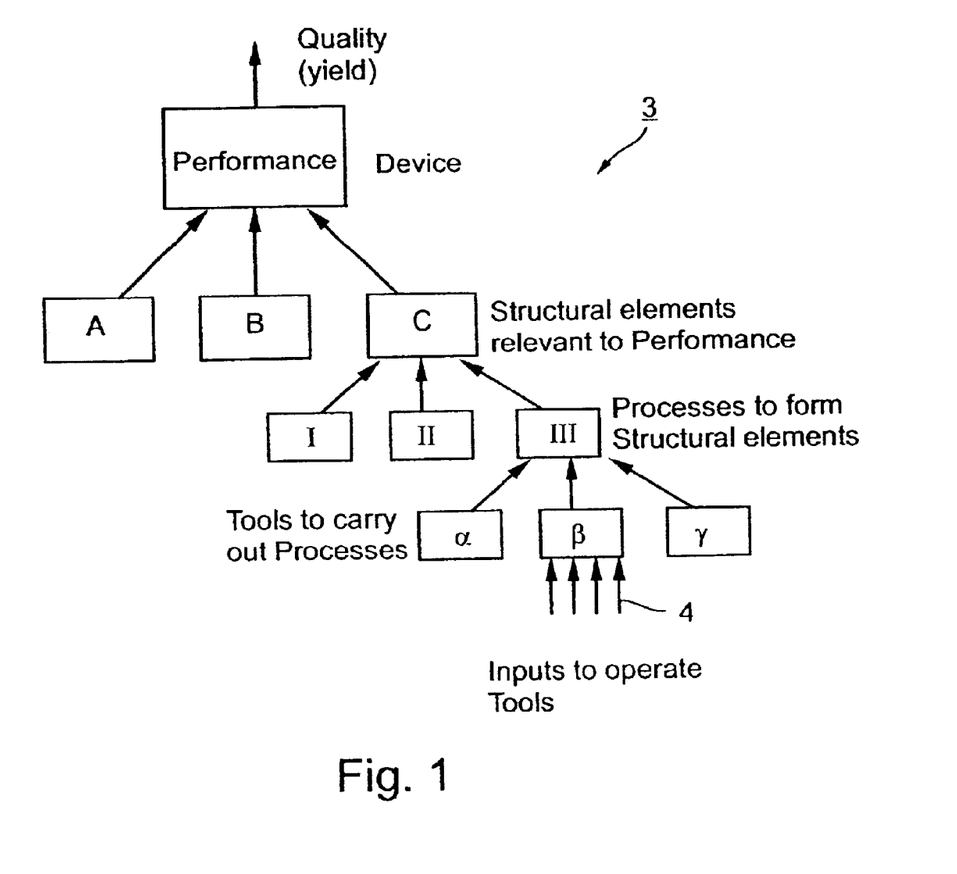
FIG. 1 shows a layout of manufacturing levels according to the present invention.

FIG. 1 depicts a scheme 3 useful to demonstrate an overview of the factors, which determine quality according to the conception of the present invention.

Quality, which resides at the top of a tree like structure, is assessed according to the performance of the product wherein "performance" may apply to any assessable attribute of the product (e.g. a speed of a transistor or the crispiness of a loaf of bread).

Performance depends on structural elements A, B, C of the product which are usually formed in a chronological order in which e.g. element C is formed when elements A and B already exist.

Each structural element e.g. element C is formed by one or more sequential processes, each process e.g. process III, is carried out by at least one manufacturing tool, and each manufacturing took e.g. tool β, has a plurality of inputs 4, which can be controlled.

Each object in FIG. 1 (an entity residing in a box) has a quantitative output (an arrow leaving the box), which is a function of the values of a respective plurality of inputs (arrow entering the box) to this object.

One of the ideas underlying the present invention is that a target output (a quantitative measure) of any object (an entity in a box) of the tree shown in FIG. 1 is automatically updated during manufacturing in order to achieve, taking into account the momentarily state of the product and the circumstances of the manufacturing process, an optimized favorable influence (an input) on another object which resides or a higher tree level.

The present invention is best explained by the way of a non-limiting example taken from the semiconductor industry.

The Device Level in Modular APC.

Figure 2:
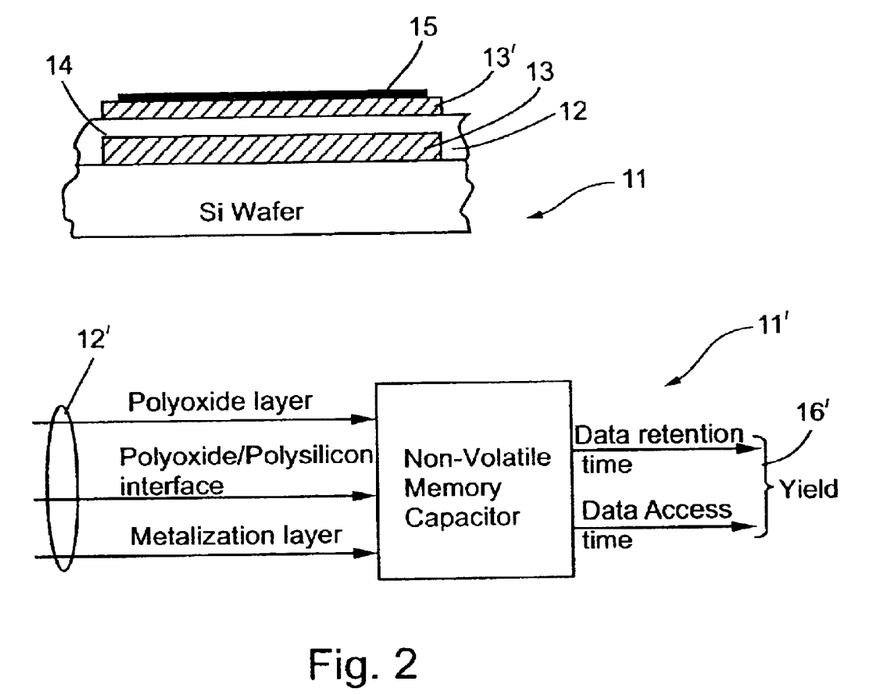
FIG. 2 shows the structure and the symbolization of a non-volatile memory capacitor.

FIG. 2 depicts a symbolization 11' of a manufactured electronic component e.g. a nonvolatile memory capacitor 11 made of a dielectric layer 12 of polyoxide (of silicon) sandwiched between two layers 13, 13' of polysilicon ($n^+$ poly-Si).

The capacitor is the final product in a microelectronic fabrication facility whose manufacturing line is process controlled according to method of the present invention.

Assume that yield of the final product is assessed with respect to two electrical parameters of capacitor 11, which are shown as output 16' of interconnection cell 11' the data retention time and the access time of component 11.

As far as data retention time is concerned, it is known in the art that in order to obtain a longer data retention time for nonvolatile memories, polyoxide layers with low leakage current, high dielectric strength and high charge breakdown are required.

Besides polyoxide layer properties, data rention time is also affected by the surface morphology of bottom polysilicon layer 13 on which polyoxide 12 is deposited. This is so because a rough surface at polyoxide/polysilicon interface 14 result in high local electric field which cause the polyoxide layer to exhibit a higher leakage current and a lower dielectric break down field.

Hence, polysilicon layer 13 has to be polished and smoothened after its deposition before a deposition of polyoxide layer 12 can take place.

A factor which has an influence on the access time of capacitor 11 is e.g. the properties on metalization layer 15, which provides contact to polysilicon layer 13'.

To represent graphically the (theoretical and experimentally validated) influences of the aforementioned structural elements of the capacitor on the production yield of component 11, a graphical symbolization of capacitor 11 known as "Knowledge Tree (KT) map" is used.

KT which is the subject of U.S. patent application entitled "A Method and Tool for Data Mining in Automatic Decision Making Systems", by Goldman, et al. filed Dec. 8, 2000 (hereinafter the KT Patent Application) is a model of relations among objects in terms of "cause and effect".

A KT map includes elements referred to as interconnection cells representing objects. The interconnection cells have inputs which represent respective influential factors on relevant outputs of the object.

Thus, interconnection cell 11' of capacitor 11 has an output representing the performance parameter 16', and has a group 12' of three inputs which consist of the following structural elements of the capacitor: "polyoxide layer", "polyoxide/polysilicon interface" and "metalization layer" all of when have influences on output performance parameters 16'.

As should be understood the inputs to interconnection cell 11' are selected by an expert physicist or an electrical engineer) who is familiar with the dependence of the performance of component 11 on its construction.

The procedure described above in which yield is translated through performance parameters into structural details, resides to what is referred to as "device level" of the APC and is an essential aspect of the present invention.

This is so because the structural elements are in turn, as shown below, outputs of the various process stages of the whole manufacturing process whose product quality is an aim of the present invention.

Suppose now that for some reason the polyoxide/polysilicon interface structural element fails to meet its designed specifications (a defect). This can occur whenever e.g. a CMP polishing tool (see below) needed to form this structural element does not operate properly.

In a conventionally process controlled production line the work piece with the defect will be thrown at this stage into wafers scrap. The device level APC according to this invention tries to "condition" the wafer for subsequent production stages in spite of the defect.

This revolutionary approach is based on the theoretical knowledge that a change of a features in another structural element e.g. polyoxide layer can compensate (with regard to performance) the effect of the unacceptable (per-se) polyoxide/polysilicon interface, (e.g. make the polyoxide layer thicken or denser).

However, such theoretical knowledge is not sufficient in order to overcome the problem. There is a need for a quantitative experimental model, which relates an output in terms of performance of the capacitor to possible combinations of input structural elements having a variety of properties (within reasonable limits).

Such a quantitative mode is provided by what is referred to as a Process Output Empirical Modeller (POEM) (see below). Then according to the quantitative predictions of the model, when a wafer with a defect in structural element B (shown in FIG. 1) arrives to a workstation which forms structural element C, inputs to an apparently completely "remote" tool (with respect to structural element B), e.g. that of tool β (the CVD machine which deposit the polyoxide) are adjusted to modify structural element B by the exact amount which is needed (a thicker polyoxide film) to leave the resulting performance intact in spite the defect in structural element B.

The Tool Level of APC.

Each member of input group 12' is formed by at least one manufacturing tools in one or more process stages, e.g. "polyoxide/polysilicon interface" 14 is an output of three consecutive stages; a chemical vapour deposition (CVD) of polysilicon layer 13 carried out by a first CVD machine, a following chemical mechanical polish (CMP) of deposited polysilicon layer 13 carried out by CMP machine, and CVD of a polyoxide 12 by a second CVD machine.

Figure 3:
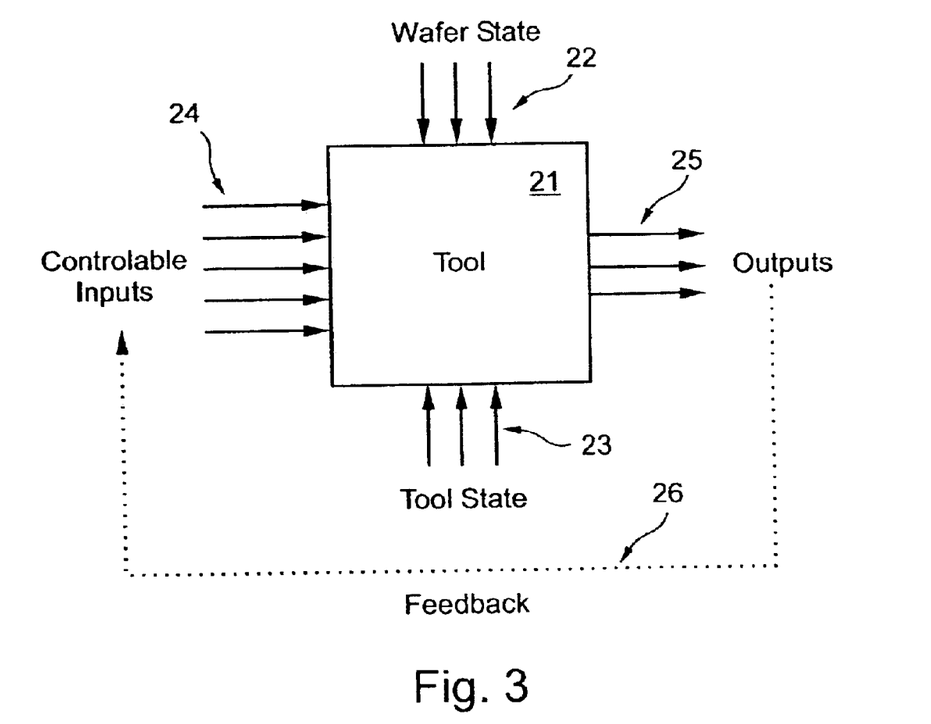
FIG. 3 shows an interconnection cell representing a tool of a process.

A method for advanced process control (APC) of a process performed by a single manufacturing tool, e.g. the CMP machine was detailed in the POEM Patent Application and its principles will be reviewed here in brief in conjunction with FIG. 3.

FIG. 3 shows an interconnection cell representing a (manufacturing) tool 21, e.g. a CMP machine to which a wafer in a certain wafer state 22, (e.g. having a certain thickness after being covered with a CVD layer of polysilicon) is introduced.

Tool 21 has its tool state 23 (e.g. pad life—the duration which the polishing pad of the machine is already in use) which influences the output of the CMP process although it cannot be controlled during an actual polishing of a wafer.

Such an influential input, which can be monitored but cannot be adjusted during a process is referred to as a measurable input.

On the other hand interconnection cell of tool 21 has a group 24 of what is referred to as controllable inputs. These are operational parameters of the machine of the polishing process such as platen rotation speed, polishing time and retaining pressure of the wafer residing in the rotating platen, all of which can be changed automatically and independently within appropriate limits.

Outputs 25 of interconnection cell of tool 21 are e.g. thickness removed by the polish thickness removal uniformity or wafer surface roughness, all of which have to be between the upper and the lower limits of the process output with optimal statistical attributes (sufficiently small standard deviation of the mean and of sigma).

All inputs, whether measurable or controllable, have quantitative attributes and are preserved as vectors, each vector having a discrete value within reasonable boundaries.

For each incoming wafer having an arbitrary (discrete) value of its wafer state vector and which is polished on a CMP machine having a given (discrete) value of its tool state vector, a combination of favorable (discrete) values of the controllable input vectors is a brief assigned for the CMP machine operation in order to give an output with best statistical goodness.

Thus a prior assignment of a combination with favorable values of controllable inputs is referred to as feed-forward, and originates from the results of a preceding modelling based on learning (e.g. by trial and error) or existing knowledge with regard to the tool behaviour.

In case that in spite the feed-forward assignment of controlled inputs, outputs deviates from specified boundaries, a feedback loop 26 is established automatically and the controllable inputs are adjusted in an optimised manner, to shift output towards target.

In the POEM Application the preceding modelling is accomplished by using what is referred to as a process output empirical controller. But other statistically correlating techniques between an output and a plurality of inputs such as: Incar regression, nearest neighbor, clustering, classification and regression tree (CART), chi-square automatic interaction detector (CHAID), decision trees and neural network empirical modeling, can be used as well.

The Module Level of APC.

Figure 4:
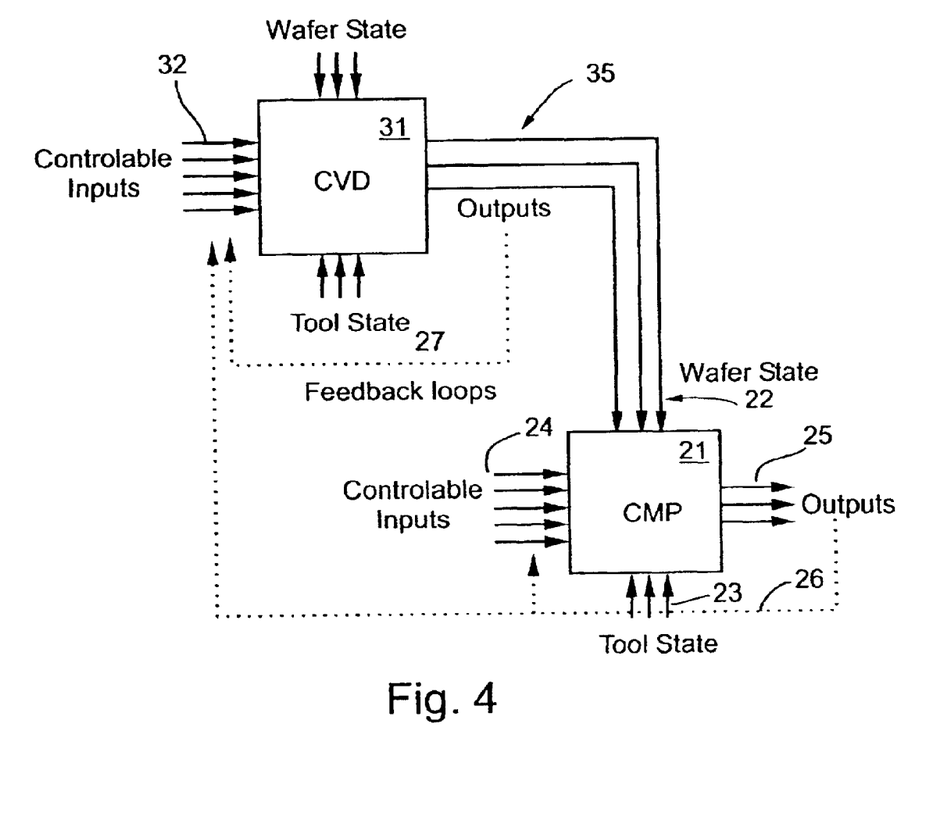
FIG. 4 shows two linked interconnection cells representing two tools in two linked process.

The aforesaid advanced process control at a single tool level is known in the prior art. One main aspect of the invention is combined process control of two or more stages in a process which are functionally coupled and carried out by two or more different manufacturing tools.

such a combined process control shown in FIG. 4 to which reference is now made, is referred in the present invention as module level advanced process control (module level APC).

FIG. 4 includes besides CMP machine 21 of FIG. 3, a CVD machine 31 whose output 35 according to our example is a polysilicon layer which is deposited on a silicon wafer (not shown) and which consist a wafer state input 22 to CMP tool 21.

Similarly to CMP machine 21 whose controls were detailed in conjunction with FIG. 3. CVD machine 31 has its peculiar controllable inputs 32, relevant to the present invention is the fact that outputs 35 of CVD machine 31 (e.g. polysilicon layer thickness and density) consist of inputs 22 to CMP machine 21.

Accordingly, a new situation arises in which inputs to CMP machine 21 lose one degree of freedom because wafer state 22 incorporates the CVD deposited polysilicon whose thickness is controlled by the CVD process. Thus output 25 of CMP tool 21 can be adjusted by controllable inputs 32 of CVD tool 31 in addition to controllable inputs 24 of CMP tool 21.

Accordingly CVD tool 31 has its autonomous feedback loop 27, however feedback loop 26 of output 25 of CMP tool 21 extends to affect also controllable inputs 32 of CVD tool 31.

It is now clear that disregarding monetarily the chronological order of the processes and the interrelations between tool, the final output of the process shown in FIG. 4 (i.e. a polysilicon layer having a thickness, a thickness uniformity and a surface roughness, all within specifications) is an outcome which depends on the first hand on the separate performance of each tool per-se.

However in the APC of the combined action of the CVD and the CMP tools, referred as to module level APC, the aforementioned final output is what matters.

Accordingly, CMP tool 31 can perform a "corrective action" to compensate for an unfavorable operation of CVD tool 21, while CVD tool 21 can take a "counter measure" to compensate for an anticipated deficiency performance of CMP tool 31.

Practically this is done by modelling quantitatively the effect, which each of the outputs of each of the tools has on the final output which results from the combined action of the tools.

Figure 5:
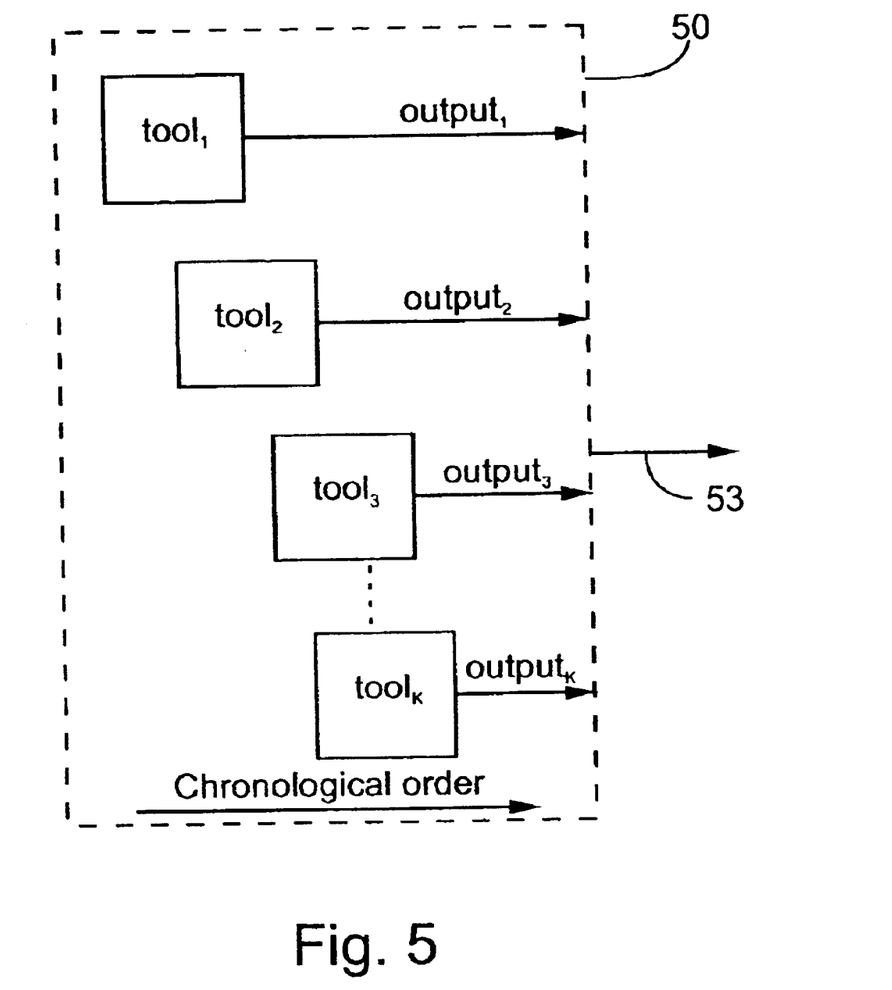
FIG. 5 shows elements in a modular tool process control.

This modelling, which is performed by a mechanism which is referred to as a modular POEM is best explained in conjunction to FIG. 5 to which reference is now made.

FIG. 5 shows a plurality of tools, $tool_1$-$tool_k$ drawn according to their hierarchy (a term to be defined below) wherein their $output_1$-$output_k$ are input variables to a "virtual" modular 50 whose output is a final output 53 of the combined process in which $tool_1$-$tool_k$ participate.

The algorithm and mechanisms of the modular POEM are identical to that of the POEM in the tool level which was detailed in the POEM Application (e.g. monitoring correlations between processes inputs and outputs, which provide raw data regarding output in response to various combinations of input values, statistical analysis of the acquired raw data and the providing of lookup tables) except for the fact that the input variable in the modular POEM consist of individual tools output rather than of tools controls as in the tool POEM.

Thus, for a target value of final output 53 the modular POEM looks for the most favorable combination of tools outputs, $output_1$-$output_k$ which results with that target value of final output 53 having the best statistical merits.

Once individual $output_1$-$output_k$ were assigned by the modular POEM as target outputs of the individual tools, the tool POEM of each tool "takes care" as described in the POEM Application, to choose the optimal operational controls of that tool depending on its tool state.

It will now be explained how the modular POEM optimises the multi-tool process.

Suppose that each of $tool_1$-$tool_k$ has its respective designed target values and firstly, a wafer is coming out of $tool_1$ having a wafer state, which is represented by $output_1$ and which is determined by the actual performance of that individual tool. Then according to the aforementioned POEM terminology, the controllable input of the modular POEM ($output_1$ of $tool_1$) has changed into a measurable input. Modular POEM gets into its lookup table and chooses a new optimised combination of $output_2$-$output_k$ together with said given $ouput_1$ to comply optimally with target value of final output 53.

The important point to observe is that during the aforementioned new optimised combination, new target values are assigned to the outputs of each one of the tools $tool_2$-$tool_k$ (although some of them may keep their former target values).

Now as the process advances and $tool_2$ affects the process, also $output_2$ will turn from a controlled input to the modular POEM into a measurable input and the number of controllable variables of the modular POEM will reduce to k-2. A new reassignment of target values to output of tools $tool_3$-$tool_k$ will take place and so on, where the degree of freedom to choose controllable inputs to the modular POEM drops by a unit each time a tool finished its roll in the multi-tool process.

A specific important case occurs e.g. in our example, when it is that output target of CVD took 31 is adjusted according to output 25 of the subsequent CMP machine 21. That will happen when one is "preparing" the tools for the next wafer e.g. after learning according to observation of the previous wafer, that the CMP tool has a deficiency, which one would like the CVD tool to compensate in advance.

This is to say that in a combined process control according to the present invention it is possible that a target output of a first process is reassigned according to an output of a second process regardless the chronological order (or hierarchy) of the processes.

In a manufacturing line, a multiplicity of machines of the same type performs the same process on a plurality of wafers. It should be noted that it is the wafer which is the complex between two tools i.e. CVD machine I is coupled to CMP machine J whenever a specific wafer goes from CVD machine I to CMP machine J. A moment later a new output wafer of CVD machine I may arrive to CMP machine K, coupling CVD machine I to CMP machine K and so on.

Thus, members of a tool couple in module level APC are dynamically interchanged during the production.

Another situation, which deserves addressing in the application of the module level APC arises when the throughput of the two coupled tools differ greatly.

Suppose that a CVD machine that consist of the first tool can accommodate a plurality of wafers (positioned on a rotating tray) in a single run, while a CMP machine which consist of the second tool can only handle a single wafer at a time.

Or conversely, a plurality of CMP machines in line, have to polish plurality of wafers preparing them to a film deposition which is carried out in a single run of a second CVD machine. In these cases production considerations dictate that several CMP machines in line have to polish in parallel the wafers output (or input) of a single run of a single CVD tool.

These situations usually consist of no problem according to the present invention (except for the fact that there may be a larger number of inputs to modeller 50), because the target values that are assigned to a tool does not depend on tool identity (among the group of tools which do the same function) or on the tool state, and each individual tool has its autonomous tool POEM which takes care that the tool's controllable operational inputs comply with the target output value which was assigned to the tool by the modular POEM.

The Hierarchical Order of the Tools in the Process Module Level APC.

So far, APC of one or more processes, which are related to only one input (the polysilicon/polyoxide interface) of interconnection cell 11' in the device level of the example were considered. It should be evident that other inputs to interconnection cell 11' (such as e.g. the metalization layer) shown in FIG. 2 are associated with additional semiconductor manufacturing activities such as photolithography, ion implantation and wet or dry etching.

Such typical manufacturing stages in a semiconductor plant are physically and logically interrelated to each other. In a nested symbolization structure as displayed in the KT map of a larger manufacturing process shown in FIG. 6A to which reference is now made.

Figure 6A:
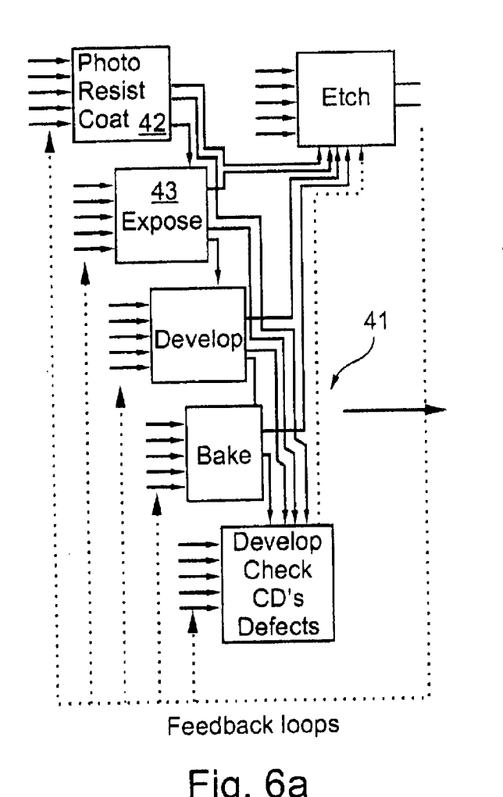
FIGS. 6A and 6B show the hierarchy structure of processes and tools in these accesses respectively.

FIG. 6A shows a block 41 of the KT map whose description was detailed in conjunction with FIG. 13 of the Knowledge Tree Patent Application, and which includes the processes needed in order to apply a patterned metalization layer 15 (metallic contacts), having a geometric feature called desired critical density (CD), to polysilicon layer 13' of capacitor 11.

Each interconnection cell in KT map block 41 is associated with a manufacturing tool needed to accomplish the process represented by the respective interconnection cell.

Figure 6B:
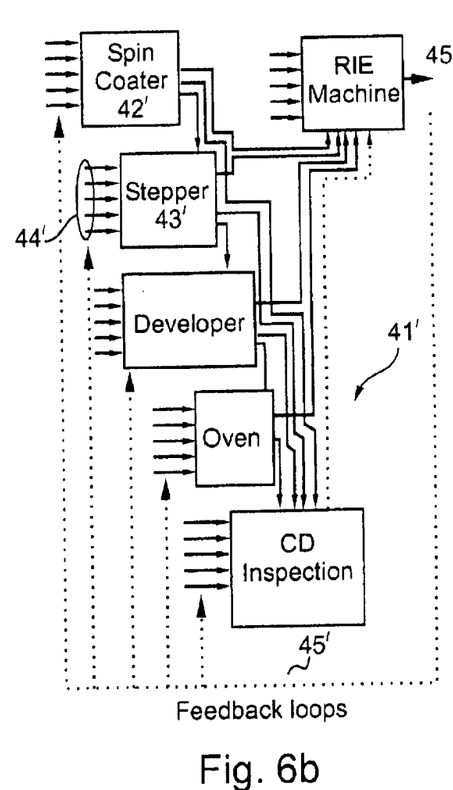

This is shown in FIG. 6B to which reference is now made, e.g. interconnection cell 43 "expose" is associated with a stepper took 43' which performs the exposure stage, while interconnection cell "photo resist coat" 42 is associated with a spin coater 42' which coats the wafer with photo resist.

The KT map block 41 has a corresponding image; a tool modular structure 41' in which each processing stage of KT map block 41 is replaced by its respective manufacturing tool.

FIG. 6B shows a modular structure, which includes a plurality of tools operated at a regionally order in accordance with the KT map of the manufacturing. The APC of the contact critical density, which is an output of this multi-tool modular structure is substantially a multiplication of the modular APC of a combined couple of tools, which was previously described.

The yield 45 of tools module 41' shown in FIG. 6B is assessed with respect to the critical density of the contact pattern, and all the controlled inputs of all the tools included in tool module 41' are enslaved either by feed-forward inputs e.g. as controlled input group 44' to stepper 43', or by a multiplicity of feedback loops 45', to achieve the target value of yield 45.

Accordingly, processes and tools have a hierarchical structure. The hierarchical core of processes is determined according to their chronological order. The later the process performed in the manufacturing, the highest is its ranking score. The tools are ranked according to the ranking of the processes, which they carry out, and a highly ranked tool is feeding back the controlled inputs of all the tools which are ranked lower.

On the other hand the higher the hierarchical ranking of a tool is, the higher is its "accumulated tolerance" i.e. the wafer which enters thus this tool has "utilized" the manufacturing tolerance of all the lower ranked tools with respect to the structural element which is formed by the module. Thus tolerance at this stage becomes marginally small, which "locks" the values of the apparently controlled input of that high ranked tool, converting those input into measurable inputs.

Figure 7:
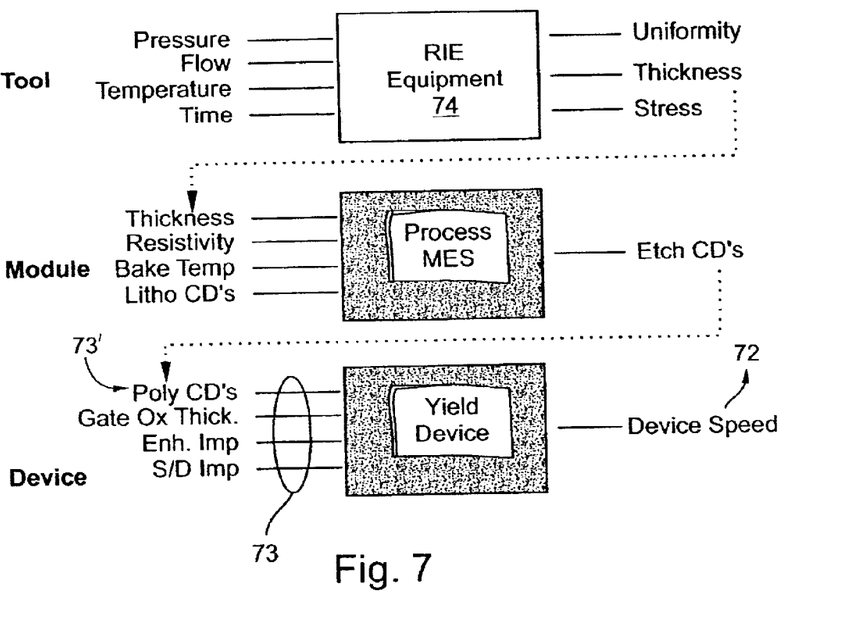
FIG. 7 shows three levels of process control according to the present invention.

FIG. 7 shows another example; the production of a field effect transistor (FET), whose controlled yield is assessed with respect to its rise time speed 72.

Device speed 72 depends on a group 73 of various structural elements among them are metallic contacts applied to a gate oxide, having a multiple characteristic critical density. (Poly CD's. 73').

At least one process, usually more than one forms each structural element of group 73, and using at least on type of tools carries out each process.

F.g. contact CD is the final output of a sequence of several dedicated processes to produce metallic contacts, the final one of which is a reactive ion etching process performed by a reactive ion etching (RIE) machine 74 which is highest ranked among the tools included in a tool module of the machines needed for carrying out these sequence of processes.

Figure 8:
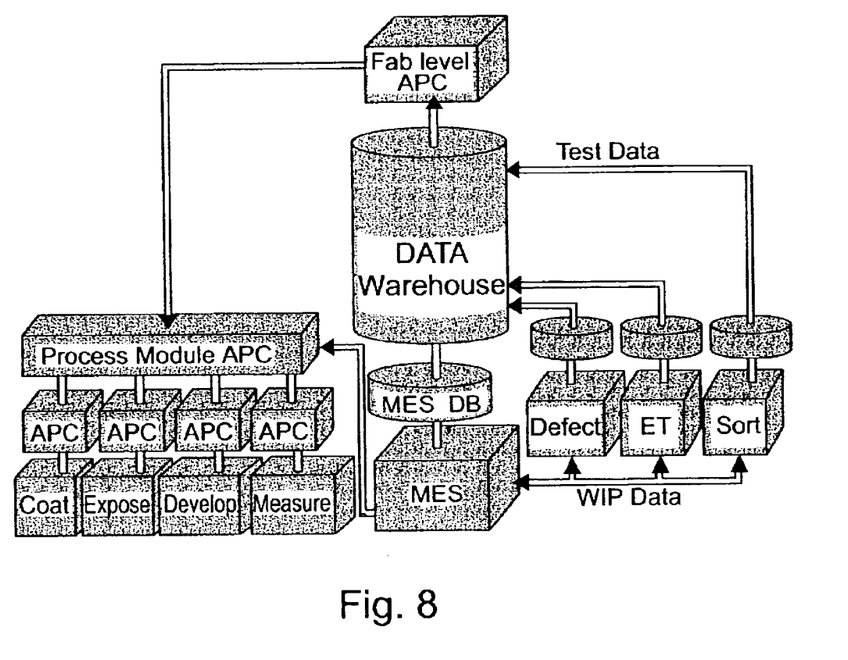
FIG. 8 shows the upper fabrication facility level of process control.

FIG. 8 shows a scheme of a total APC of the whole microelectronic manufacturing fabrication facility (Fab), wherein all data relevant to the manufacturing and evaluating of a product are stored in a Data Warehouse.

The Data base of the Data Warehouse includes include the lookup table of each tool, the updated tool state of each tool, the book-keeping of the wafer state of each wafer at each moment and the performance of each device produced on a wafer.

The APC algorithm of the present invention utilized data supplied by hardware and software components, which are included in what is referred to as-yield enhancing system.

Figure 9:
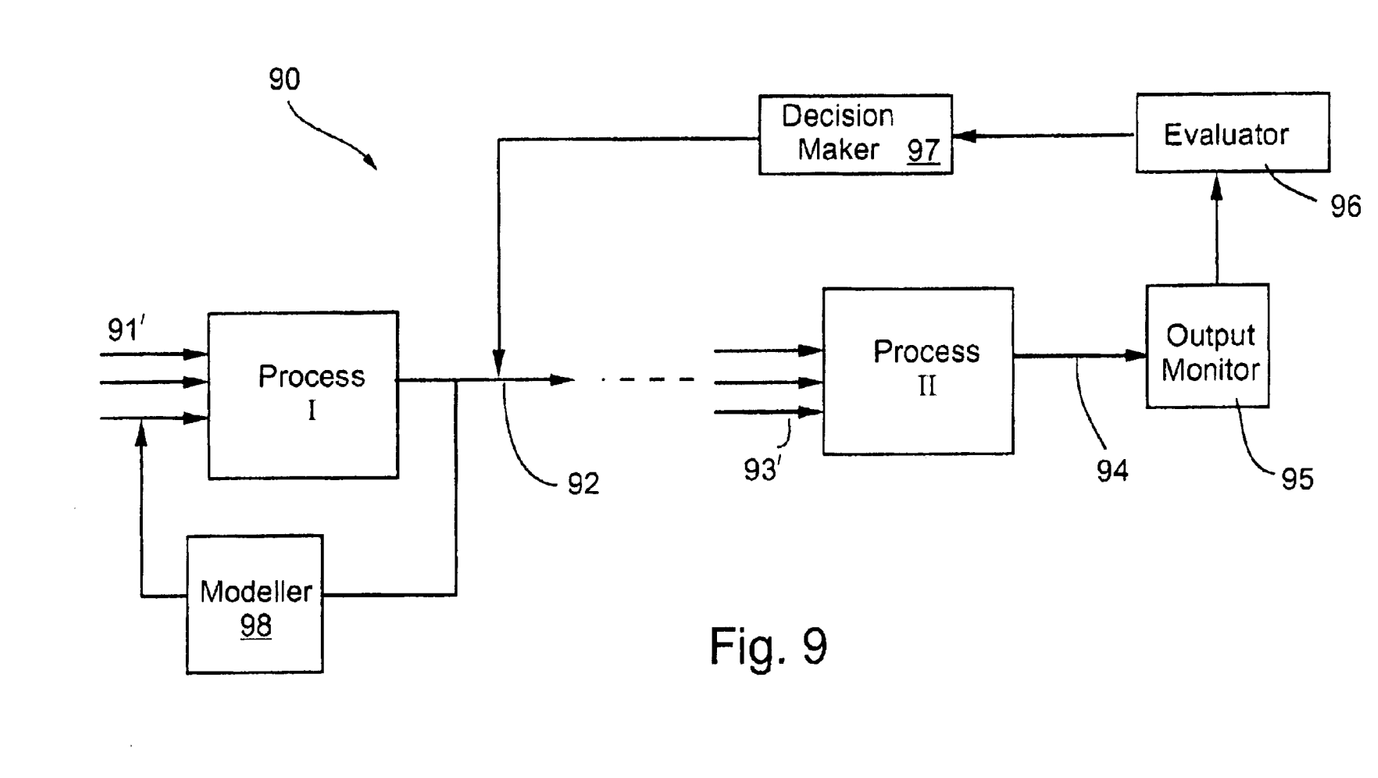
FIG. 9 shows a system for an integral process control according to present invention.

The yield enhancing system generally includes all the elements, which are included in the system for monitoring a process having a plurality of input parameters, which was described in the POEM Application yet the yield enhancing system has its peculiar features which some of them are described in conjunction with FIG. 9 to which reference is now made.

Shown in FIG. 9; Process I has a target output 92, which is an influential factor on input 93' of process II. Process II has an output 94 whose value is monitored by output monitor 95 and is evaluated by output evacuator 96. Then, based on the evaluation score of the monitored output of process II, a new value is assigned to target output 92 of process I by an intelligent decision maker 97.

In order to meet the newly assigned target output 92, the respective value of input vector 91 are adjusted by experimental modeller 98.

While the invention has been described with respect to a limited number of embodiments, it will be appreciated that many variations, modifications and other applications of the invention may be made without departing from the spirit and scope of the invention.

What is claimed is:

1. A method for controlling a quality of a product during product manufacturing, wherein the manufacturing includes a plurality of modular manufacturing processes, each process among the plurality of modular manufacturing processes having an assigned value setting a process target output, the method comprising the steps of:
   i) in a database:
      (a) assigning to said product a predetermined criteria with respect to a performance of said product;
      (b) linking said performance to a feature of at least one structural element of the product,
      (c) associating said feature of said at least one structural element with at least one stage in one of said modular manufacturing processes which forms said at least one structural element,
   ii) measuring an actual process output of said one of said modular manufacturing processes, and
   iii) using said database if said actual process output deviates from a respective assigned value of said one of said modular manufacturing processes, reassigning the assigned value of at least one target output of a succeeding process among the plurality of processes in accordance with said actual process output or in accordance with said deviation thereby to reoptimise for variables in said database following said deviating of said process output,
   wherein the plurality of processes are controlled by a modular process control and said database comprises logical links between said variables.

2. A method for controlling a product quality as in claim 1 wherein said modular process control includes a process control selected from the group consisting of a semi-automatic process control and an automatic process control.

3. A method for controlling a product quality as in claim 2 wherein said automatic process control includes the use of a quantitative empirical modeller.

4. A method for controlling a product quality as in claim 3 wherein said quantitative empirical modeller includes at least one statistical technique selected from the group consisting of linear regression, nearest neighbour, clustering, process output empirical modelling (POEM), classification and regression tree (CART), chi-square automatic interaction detector (CHAID), decision trees and neural network empirical modelling.

5. A method for controlling a product quality as in claim 1 wherein said product quality is assessed with regard to products selected from the group consisting of semiconductor devices and semiconductor components.

6. A method for controlling a product quality as in claim 5 wherein said performance includes electronic specifications of said product.

7. A method for controlling a product quality as in claim 1 wherein said steps are effected at a microelectronic manufacturing facility.

8. A method for controlling a product quality as in claim 1 wherein said at least one stage in a process is carried out with at least one tool, said process control of said at least one stage affecting an operation of said tool.

9. A method for controlling a product quality as in claim 8 wherein said at least one stage is carried out by at least one first tool and at least one second tool.

10. A method for controlling a product quality as in claim 9 wherein an output of said at least one first tool is a measurable input to said at least one second tool.

11. A method for controlling a product quality as in claim 10 wherein a throughput of said at least one first tool differs substantially from a throughput of said at least one second tool.

12. A method for controlling a product quality as in claim 9 further comprising the step of:
   (f) controlling a controllable input of said at least one first tool according to an output of said at least one second tool.

13. A method for controlling a product quality as in claim 8 wherein said structural element is formed by at least one first modular manufacturing process and at least one second modular manufacturing process, the method further comprising the step of:
   (f) relating said first process to said second process using a Knowledge Tree map.

14. A method for controlling a product quality as in claim 13 wherein an output of said at least one tool of said at least one first process is a measurable input to said at least one tool in said at least one second process.

15. A method for controlling a product quality as in claim 13 further comprising the step of:
   (f) controlling a controllable input of said at least one tool in said at least one process according to an output of said at least one tool of said at least one said second process.

16. A method for controlling a product quality as in claim 13 wherein a throughput of said at least one tool of said at least one first process differs substantially to a throughput of said at least one tool in said at least one second process.

17. A method for controlling a product quality as in claim 8 wherein said at least one stage is carried out by at plurality of tools, each tool among said plurality of tools having a ranking score according to a hierarchy of said each tool in respective manufacturing process, the method further comprising the step of:
   (f) controlling a controllable input of a first of said plurality of tools according to an output of a second of said plurality of tools that has a higher ranking score than a ranking score of said first tool.

* * * * *